United States Patent
Youngren et al.

(10) Patent No.: US 8,510,209 B2
(45) Date of Patent: *Aug. 13, 2013

(54) SETTLING OVER-THE-COUNTER DERIVATIVES USING SYNTHETIC SPOT BENCHMARK RATES

(75) Inventors: Steven A. Youngren, Elgin, IL (US); Derek Louis Sammann, Glencoe, IL (US); John W. Labuszewski, Westmont, IL (US); David Joseph Schulz, Highland Park, IL (US); Scott A. Brusso, Oak Park, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,535

(22) Filed: Aug. 15, 2011

(65) Prior Publication Data
US 2011/0295737 A1     Dec. 1, 2011

Related U.S. Application Data

(63) Continuation of application No. 12/907,505, filed on Oct. 19, 2010, now Pat. No. 8,010,444, which is a continuation of application No. 11/943,308, filed on Nov. 20, 2007, now Pat. No. 7,840,483.

(51) Int. Cl.
*G06Q 40/00*    (2012.01)
(52) U.S. Cl.
USPC .......................................................... 705/37
(58) Field of Classification Search
USPC .......................................................... 705/37
See application file for complete search history.

(56) References Cited

U.S. PATENT DOCUMENTS

| | | | |
|---|---|---|---|
| 7,496,531 B1 * | 2/2009 | Gastineau et al. | 705/35 |
| 2002/0042765 A1 | 4/2002 | Dawson | |
| 2002/0111896 A1 * | 8/2002 | Ben-Levy et al. | 705/37 |
| 2002/0161693 A1 | 10/2002 | Greenwald | |

(Continued)

FOREIGN PATENT DOCUMENTS

| | | | |
|---|---|---|---|
| EP | 1 049 037 | * | 11/2000 |
| EP | 1 526 473 | * | 4/2005 |

OTHER PUBLICATIONS

Madhavan, Ananth: VWAP Strategies, Transaction Performances, Spring 2002, pp. 32-38.*

(Continued)

*Primary Examiner* — Bijendra K Shrestha
(74) *Attorney, Agent, or Firm* — Banner & Witcoff, Ltd.

(57) ABSTRACT

Techniques and systems for settling over-the-counter financial instruments includes sampling over a periodic interval are disclosed. A volume weighted average price of the sampled process may be calculated and forward points may be applied to the volume weighted average priced to determine an associated spot exchange rate. Such a synthetic spot FX exchange rate may be published to subscribers. Over-the-counter financial derivatives may establish delivery obligations according to the spot exchange rate. In the event where a number of transactions during the sampling period is less than a threshold, a midpoint of bids and asks associated with orders for the exchange traded financial derivative may be used to determine an average of the midpoint, to which the forward points may be applied to determine the spot exchange rate. Alternatively, the time-weighted average of the bid and ask orders during a periodic interval may be used in computing the volume-weighted average price.

19 Claims, 2 Drawing Sheets

(56) References Cited

U.S. PATENT DOCUMENTS

| | | | |
|---|---|---|---|
| 2003/0093360 A1* | 5/2003 | May | 705/37 |
| 2003/0177126 A1* | 9/2003 | Weingard et al. | 707/10 |
| 2004/0138983 A1 | 7/2004 | Nishimaki | |
| 2005/0080734 A1 | 4/2005 | Lynch et al. | |
| 2006/0218075 A1* | 9/2006 | Feldman et al. | 705/37 |
| 2006/0224492 A1 | 10/2006 | Pinkava | |
| 2006/0253367 A1* | 11/2006 | O'Callahan et al. | 705/37 |
| 2007/0038550 A1* | 2/2007 | Caille et al. | 705/37 |
| 2007/0118459 A1* | 5/2007 | Bauerschmidt et al. | 705/37 |
| 2008/0120246 A1* | 5/2008 | Sopinsky et al. | 705/36 R |
| 2009/0048982 A1* | 2/2009 | Payton et al. | 705/36 R |

OTHER PUBLICATIONS

Baburaj, M: Margins and Limits__Amended 2, National Commodity & Derivatives Exchange Limited, Jul. 30, 2004, pp. 1-3.*

Safarik, Daniel: The 'Holy Grail': Pre-Trade Analytics, Mar. 1, 2005, Advanced Trading, pp. 1-4.*

Frino et al.: Market Insights: The Cost of Executing Large Orders: SFE 90 Day Bank Bill Futures Versus OTC Products, Austrlian Securities Exchange (ASX), Aug. 2007, pp. 1-10.*

"Exchange rate," pp. 1-3, http://en.wikipedia.org/wiki/Exchange_rate, downloaded Nov. 5, 2007.

Derivative Instruments, pp. 1-8, ©1997-2003 by Montego Data Limited, downloaded Nov. 5, 2007.

PCT International Search Report mailed Jan. 23, 2009, PCT/US 08/83883, 8 pages.

Coggins et al., Algorithmic Trade Execution and Market Impact, IWIF 1, 2004, Melbourne, Australia, www.iwif.org, pp. 518-547.

Isberg, G., The Interbank Currency Swap Market, Monetary Bulletin Mar. 2002, pp. 32-35.

Australian Patent Examination Report dated Aug. 16, 2012, Patent Application No. 2008326505, 3 pages.

* cited by examiner

SETTLING OVER-THE-COUNTER DERIVATIVES USING SYNTHETIC SPOT BENCHMARK RATES

RELATED APPLICATIONS

The present application is a continuation of U.S. patent application Ser. No. 12/907,505 filed Oct. 19, 2010 which is a continuation of U.S. patent application Ser. No. 11/943,308 filed Nov. 20, 2007 which issued on Nov. 23, 2010 as U.S. Pat. No. 7,840,483. The entire disclosures of all priority applications, including the application listed above, are hereby incorporated by reference in their entireties.

TECHNICAL FIELD

The present invention relates generally to operating a market, and particularly to settlement of over-the-counter derivative products traded in a market using a spot rate.

BACKGROUND

Over-the-counter (OTC) financial derivative products are generally financial instruments or investment vehicles that include custom-tailored, negotiated contracts that are bought, sold, or otherwise exchanged between parties. That is, the OTC financial derivatives are typically not exchange traded. OTC derivatives may include options, forward contracts, foreign exchange (FX) spot and forward contracts, stocks, securities, bonds and any other financial product or investment vehicle that may be traded between parties.

It is desirable for the products to have a payoff that can be easily tracked or monitored using a computer model that may produce a theoretical value for closing and/or settlement purposes. Typically, the settlement or payoff for an OTC derivative may be determined according to conventional International Swap and Derivatives Association (ISDA) rules. The open position on a financial product may be periodically determined prior to expiry through a mark-to-market accounting process where the position is determined according to an agreed upon standard or benchmark. The standard or benchmark may fluctuate or vary with changes in the market. The final payoff may be determined for the derivative product as calculated according to the benchmark at expiration of the product.

The foreign exchange (FX) derivatives, such as options on foreign exchange instruments, may be settled according to an agreed upon benchmark. The benchmark may be a spot benchmark that indicates a spot exchange rate between two currencies for a given moment in time. Current benchmarks used for FX derivative products are determined through a survey of traded price information for spot FX rates that are made available from electronic trading systems. Other benchmark rates, such as the WM/Reuters Spot Rates and the 1FED FX exchange rate published daily by the Federal Reserve Bank of New York, include a buying rate between a variety of currency pairs. The benchmarks do not provide an optimally accurate and reliable benchmark for settling OTC derivatives, such as spot FX products. In addition, the benchmarks and the methods used to determine the benchmarks are not transparent to the public and the price inputs are typically weighted equally. Other currency fixing prices (e.g., The Chicago Mercantile Exchange's (CME) "Currency Fixing Prices") may be determined through a volume weighted average for future contracts. However, such systems currency fixing prices do not provide a spot FX benchmark rate.

It would be desirable to provide apparatuses, processes and methods for settling OTC derivatives, such as FX derivative products, using synthetic spot benchmark rates.

SUMMARY

Aspects of the invention provide a new synthetic spot FX benchmark rate derived from nearby FX futures prices and forward points. The new synthetic spot FX benchmark rate may be used to settle financial derivative products, such as the exercise of an OTC FX option at termination. The benchmark may be determined using a combined process of traded prices with a weighing of the prices by an amount of volume in each associated transaction. A benchmark may be calculated using the volume weighted average price (VWAP) of the FX future for the closing portion of the reporting period. Forward points may be applied to IMM dates to back out a spot FX benchmark rate. That is, volume-weighted FX futures price inputs may be adjusted to spot equivalents by adding or deducting forward points to the delivery dates of the price on the traded futures contracts. The benchmark may be calculated hourly, daily or at any other period. OTC derivatives, such as options, may be settled to the benchmark.

In one example, a computer-assisted method for use with settling an over-the-counter derivative product is disclosed. The method may comprise one or more of the following steps: receiving information about a plurality of completed transactions for an exchange-traded financial derivative; computing a volume-weighted average price based on the information received; applying forward points to the volume weighted average price to determine a spot exchange rate between two currencies; determining a settlement price for the over-the-counter derivative product according to the associated spot exchange rate; and publishing the settlement price. In some examples where the number of completed transactions in a period is less than a predetermined threshold, the volume-weighted average price may be computed using an average of a midpoint of bids and asks of orders for the exchange-traded financial derivative during the periodic interval. In other examples where the number of completed transactions in a period is less than a predetermined threshold, the computed average may be a time-weighted average of bids and asks of orders over a periodic interval for the exchange-traded financial derivative.

Other embodiments are disclosed, and each of the embodiments can be used alone or together in combination. Additional features and advantages of the disclosed embodiments are described in, and will be apparent from, the following Detailed Description and the figures.

DETAILED DESCRIPTION

Exemplary embodiments of methods, apparatuses, and systems that provide for settling OTC derivatives, such as foreign exchange (FX) derivative products, using synthetic spot benchmark rates are disclosed and discussed below.

An example of an FX derivative product includes an FX futures product. An FX futures product may be considered a transferable futures contract that specifies the price at which a specified currency can be received or delivered at a specified future date. The date on which the currency is received or delivered generally follows the International Monetary Market (IMM) dates. FX future contracts may be used by investors to hedge against foreign exchange risk. The contracts are generally exchanged-traded and delivery or execution of the contract is guaranteed by a central counterparty, such as a clearing house. Traders in an FX Futures contract typically have an open position, or open interest, until the trader exits the position or the delivery date specified by the contract. The value, or profits and losses associated with the open position in the FX futures contracts are generally accounted for through a marked-to-market accounting basis. The trader may exit the position by entering a new FX Future contract with an opposite position to the trader's current position prior to the contract's delivery date. Another example of an FX derivative product is an FX option, which is discussed in additional detail below.

Disclosed are embodiments for settling OTC derivatives using synthetic spot benchmark rates provide for an accurate, reliable and transparent benchmark rate for settling OTC derivative products. Methods for settling FX derivatives using synthetic spot benchmark rates use FX futures trade prices and associated volumes for average price weightings plus vendor or GFX-supplied forward points to derive synthetic spot FX rates at selected times. Alternatively or in addition, when sufficient FX future trade prices and/or volumes are not available, then the midpoints of FX futures bid/ask spreads from an electronic trading platform, such as the CME Group Globex electronic trading platform, may be used. This conversion may provide buyers and sellers of derivative product a reliable benchmark to which an FX derivative product may be settled at expiration.

Figure 1:
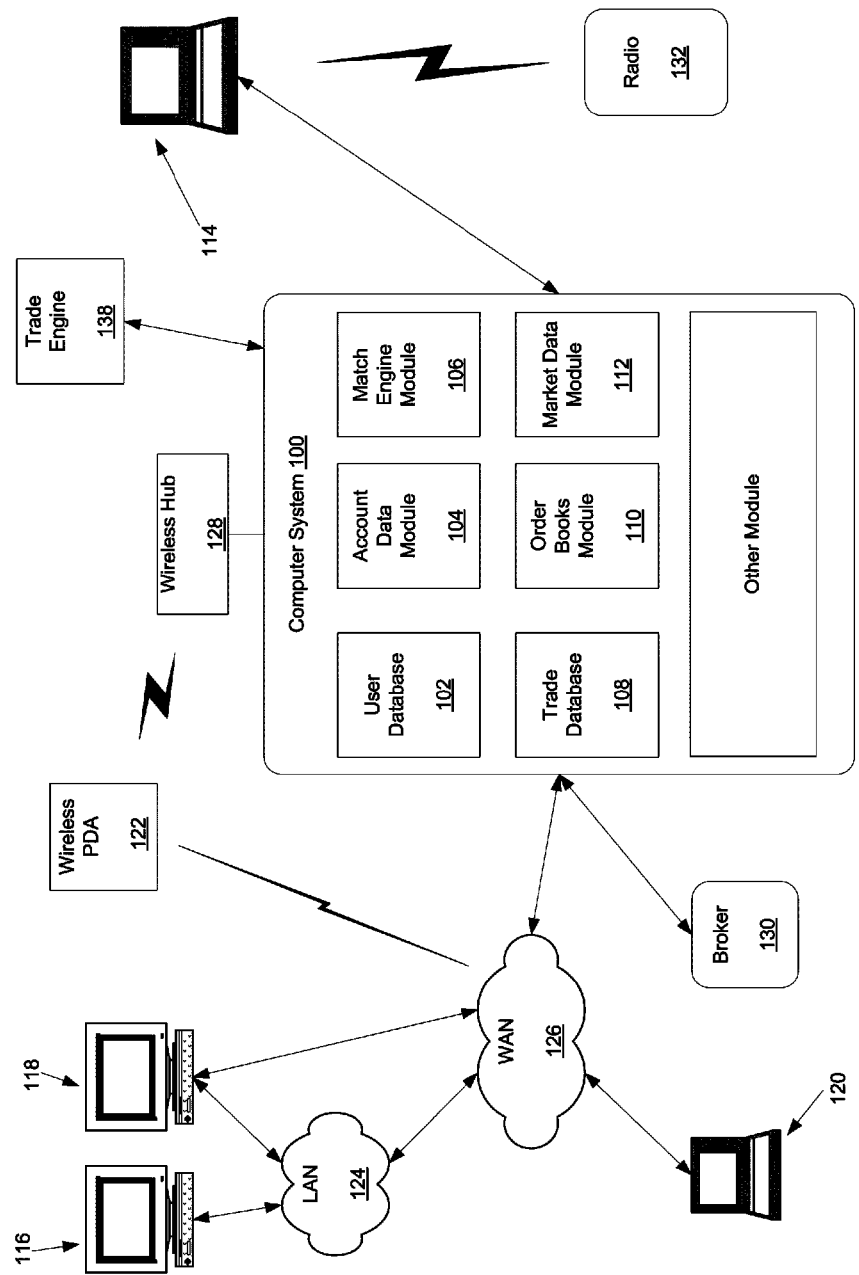
FIG. 1 depicts an illustrative computer network system that may be used to implement various aspects of the invention.

FIG. 1 depicts an illustrative computer network system that may be used to implement various aspects of the invention. Aspects of the invention are preferably implemented with computer devices and computer networks that allow users to exchange/receive information including, but not limited to synthetic spot FX benchmark rates and trading information. A computer system 100 receives market data and other information, calculates various values in accordance with aspects of the invention, and transmits synthetic spot rates to users. A user database 102 includes information identifying traders and other users of computer system 100. Data may include user names and passwords. Computer system 100 may be implemented with one or more mainframe, desktop or other computers.

Referring to the exemplary trading network environment of FIG. 1, the computer system 100 may comprise various modules for performing functions in accordance with various aspects of the invention. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission or use.

The trading network environment shown in FIG. 1 includes computer devices 114, 116, 118, 120 and 122. Each computer device may include a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to computer system 100. Computer system 100 and computer device 114 may be connected via a T1 line, a common local area network (LAN), wirelessly, or any other mechanism for allowing computer devices to communicate. The user of computer device 114 may transmit/receive the trade or other information to/from computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more broker/agent 130 may function as a neutral party to regulate the settlement of over-the-counter financial products between counterparties using a synthetic spot benchmark rate from computer system 100. One skilled in the art will appreciate that numerous additional computers and systems may be coupled to computer system 100. Such computers and systems may include, but are limited to, clearing, regulatory, and/or fee systems.

The operations of computer devices and systems shown in FIG. 1 may be controlled by computer-executable instructions stored on computer-readable storage medium. For example, computer device 116 may include computer-executable instructions for receiving rate and other information from computer system 100 and displaying to a user. In another example, computer device 118 may include computer-executable instructions for receiving market data from computer system 100 and displaying that information to a user.

Of course, numerous additional servers, computers, handheld devices, personal digital assistants, telephones and other devices may also be connected to computer system 100. Moreover, one skilled in the art will appreciate that the topology shown in FIG. 1 is merely an example and that the components shown in FIG. 1 may be connected by numerous alternative topologies.

Figure 2:
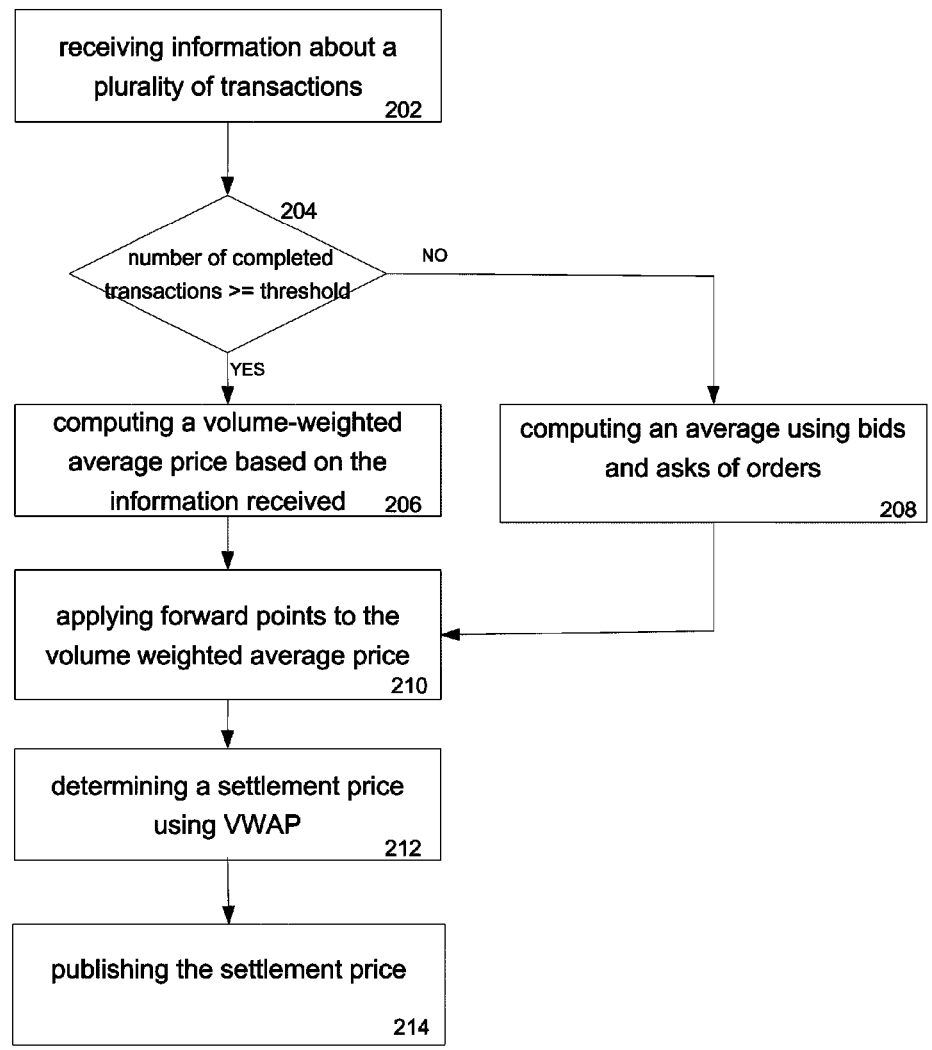
FIG. 2 illustrates an example of a method for generating a settlement price in accordance with aspects of the invention.

Referring to FIG. 2, a flowchart is shown to illustrate one example of a method for generating a volume-weighted average price ("VWAP futures price") for each nearby, liquid CME FX futures contract. For example, at periodic intervals, such as 30 second intervals ending on an hour, a benchmark rate for the interval may be determined. A volume-weighted average price (CME VWAP FX futures price) may be calculated for the interval. In step 202, a computing system 100 may receive and process information to be used for the VWAP calculation. The information may include the final price and volume of the completed transactions. In one example, the VWAP may be determined (in step 206) using information from various sources including, but not limited to CME Globex sales, or executed transactions during the interval. For contracts having a high volume or greater liquidity, the prices may be taken at a known period of time when there is a large amount of market activity, such as at 2:00 p.m.

In the event that less than a predetermined number of trades (e.g., a predetermined threshold of three) during the interval are available (step 204), then bid/ask data may be used to determine the midpoint of the bid/ask spread during a periodic interval (e.g., 30 seconds) in step 208. Samples of the bid/ask may be taken periodically, such as at least once per second, or randomly to compile a set of observed bid/asks during the interval. The VWAP FX futures price may be determined using the average of the midpoints of each observation. In one example, the computation above may be calculated not in real time (i.e., the calculation procedures are a "look back"). In other words, the relevant period of data is first collected and the computations performed after the data for the period has been collected. In another example, the calculation may be a time-weighted average, where regular intervals are defined and the calculated average is the summations of price times the interval divided by the summation of intervals.

In step 210, forward points may be applied for each currency, which are priced to IMM dates to back out spot rates from futures. The forward points are considered as being added to or subtracted from the spot exchange rate to calculate a forward price, adjusted for point size convention. In one example, the forward points may be obtained from a quote vendor, such as Reuters, Bloomberg, CME Group GFX, or others. The forward points may be added or subtracted as appropriate. The resulting value may be used as a spot rate (e.g., CME Spot FX Benchmark Rate).

Once the benchmark rates are determined, OTC products may be settled to the benchmarks in step 212. The benchmark may be published (in step 214) at various periodic intervals, e.g., perhaps hourly. One skilled in the art will appreciate that there are numerous financial products that may be settled based upon the benchmarks. For example, a FX option is yet another example of a financial product (e.g., FX derivative product) that may be settled in accordance with various aspects of the invention. An FX option may be considered a contract that grants the holder of the contract a right to buy or sell currency at a specified exchange rate during or at a specified period of time. Although the holder of the contract has the right to buy or sell, the holder is not obligated to buy or sell. A premium is generally paid in return for the right. FX options are another form of investment vehicle used to hedge against adverse movements in exchange rates. A trader may hedge against foreign currency risk by purchasing an FX option put or call. In an example, a trader may hedge against increases in the exchange rate between the U.S. Dollar and the European Euro (USD/EUR pair) by buying a call option on the USD/EUR exchange. In this manner, the trader may profit from an increase in the exchange rate.

In one example, American-style FX options would expire, and could be exercised against the daily VWAP-determined futures settlement price at options termination (pin risk will also be eliminated by removing contrary instructions to Clearing to prevent automatic exercise of expired in the money options). However, the difference between these daily VWAP-determined FX futures settlement prices and aspects of the invention would include, among other things, the adjustment to transform a "futures price" into a "spot price" for a benchmark rate using forward points. Also, the benchmarks may be calculated and published several times per day, perhaps hourly, at 9:00, 10:00, 11:00 AM, 12:00 noon, 1:00, 2:00, 3:00 PM, etc., whereas, FX settlement prices are done at 2:00 PM only.

The steps, elements and processes discussed herein may be encoded as program logic, computer readable code and/or instructions. These encoded elements, in turn, may be stored or embedded on a computer readable medium such as, for example, a hard disk drive, a solid state drive or other storage medium. The computer readable medium may be in communication with a processor which, in response to an appropriate input or command, may execute the program logic stored on the computer readable medium. The execution of this program logic may result in the execution of the step, elements and processes embodied and discussed herein.

It should be understood that various changes and modifications to the presently preferred embodiments described herein will be apparent to those skilled in the art. Such changes and modifications can be made without departing from the teachings of the present invention and without diminishing its intended advantages. It is therefore intended that such changes and modifications be covered by the appended claims.

We claim:

1. A computer-assisted method of determining a synthetic spot futures benchmark rate, the method comprising:
    calculating, by a processor, a number of completed transactions associated with contracts for an exchange-traded future during a time interval;
    if the calculated number of completed transactions exceeds a predetermined threshold, then calculating, by the processor, the benchmark rate by weighing traded prices of the contracts by an amount of volume in each completed transaction of the contracts during a predetermined time interval;
    else if the calculated number of completed transactions does not exceed the predetermined threshold, then receiving information to calculate, by the processor, a weighted average price using bids and asks of orders for the exchange-traded futures contracts for the time interval, and calculating the benchmark rate using the calculated weighted average price;
    applying, by the processor, forward points to the calculated benchmark rate to determine a spot benchmark rate;
    determining, by the processor, a settlement price for an over-the-counter (OTC) product according to the spot benchmark rate; and
    transmitting the spot benchmark rate to users at recurring intervals of time.

2. The computer-assisted method of claim 1, wherein the benchmark rate is of a foreign exchange (FX), exchange-traded futures contracts in which delivery and execution of the contract is guaranteed by a central counterparty.

3. The computer-assisted method of claim 1, where the over-the-counter product comprises a foreign exchange option contract.

4. The computer-assisted method of claim 1, wherein the applying forward points to the benchmark rate comprises applying forward points to International Monetary Market dates of the contracts.

5. The computer-assisted method of claim 1, wherein the predetermined threshold is exceeded if three associated transactions occur during the time interval.

6. The computer-assisted method of claim 1, where the calculating of the weighted average price is not performed in realtime.

7. A non-transitory computer-readable storage medium storing computer-executable instructions that cause a processor to perform a method comprising:
processing information associated with each of a plurality of completed transactions for an exchange-traded financial instrument;
computing a volume-weighted average price based on the information received, wherein the information received comprises an average of midpoints of bids and asks of orders for the exchange-traded financial instrument;
calculating a number of completed transactions associated with contracts for an exchange-traded future during a time interval;
if the calculated number of completed transactions exceeds a predetermined threshold, then calculating the benchmark rate by weighing traded prices of the contracts by an amount of volume in each completed transaction of the contracts during a predetermined time interval;
else if the calculated number of completed transactions does not exceed the predetermined threshold, then receiving information to calculate a volume-weighted average price (VWAP) for the time interval by computing an average of midpoints of bids and asks of orders for the exchange-traded futures contracts during the time interval, wherein the received information comprises prices and volume of contracts during the time interval, and calculating the benchmark rate using the calculated VWAP;
applying forward points to the calculated benchmark rate to determine the spot exchange rate; and
determining, by the processor, a settlement price for an over-the-counter product according to the spot exchange rate.

8. The computer-readable storage medium of claim 7, wherein the benchmark rate is of a foreign exchange (FX), exchange-traded futures contracts in which delivery and execution of the contract is guaranteed by a central counterparty.

9. The computer-readable storage medium of claim 7, where the over-the-counter product comprises a foreign exchange option contract.

10. The computer-readable storage medium of claim 7, wherein the applying forward points to the benchmark rate comprises applying forward points to International Monetary Market dates of the contracts.

11. The computer-readable storage medium of claim 7, wherein the calculating of the volume-weighted average price comprises computing an average of midpoints of bids and asks of orders for the exchange-traded futures contracts during the time interval.

12. The computer-readable storage medium of claim 7, wherein the predetermined threshold is exceeded if three associated transactions occur during the time interval.

13. The computer-assisted method of claim 11, where the computing is not performed in real time.

14. An apparatus, comprising:
a processor configured to execute computer-executable instructions;
a memory storing the computer-executable instructions, the computer-executable instructions causing the processor to perform a method comprising:
processing information associated with each of a plurality of completed transactions for an exchange-traded financial instrument;
computing a volume-weighted average price based on the information received, wherein the information received comprises an average of midpoints of bids and asks of orders for the exchange-traded financial instrument;
calculating a number of completed transactions associated with contracts for an exchange-traded future during a time interval;
if the calculated number of completed transactions exceeds a predetermined threshold, then calculating the benchmark rate by weighing traded prices of the contracts by an amount of volume in each completed transaction of the contracts during a predetermined time interval;
else if the calculated number of completed transactions does not exceed the predetermined threshold, then receiving information to calculate a time-weighted average price by computing summations of price times the time interval divided by the summation of the time interval, and calculating the benchmark rate using the calculated time-weighted average price;
applying forward points to the calculated benchmark rate to determine the spot exchange rate;
determining, by the processor, a settlement price for an over-the-counter product according to the spot exchange rate; and
publishing the settlement price.

15. The apparatus claim 14, where the exchange-traded financial instrument comprises one of a foreign exchange futures contracts and a foreign exchange options contract.

16. The apparatus claim 14, where the computing of the time-weighted average price comprises computing a time-weighted average of bids and asks of orders for the exchange-traded financial instrument during a periodic interval if a number of completed transactions is less than the predetermined threshold.

17. The apparatus of claim 14, where the computing is not performed in real time.

18. The computer-assisted method of claim 1, wherein the benchmark rate is calculated on one of an hourly basis and a daily basis.

19. The computer-assisted method of claim 4, further comprising: performing arithmetic on the spot exchange rate using the forward points to calculate a forward price that is adjusted for point size convention.

\* \* \* \* \*